(12) United States Patent
Kim

(10) Patent No.: US 9,103,266 B2
(45) Date of Patent: Aug. 11, 2015

(54) SYSTEM AND METHOD FOR DIAGNOSING FAILURE OF THERMOSTAT

(71) Applicants: Hyundai Motor Company, Seoul (KR); Kia Motors Corporation, Seoul (KR)

(72) Inventor: Seung Bum Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/955,402

(22) Filed: Jul. 31, 2013

(65) Prior Publication Data

US 2014/0316644 A1     Oct. 23, 2014

(30) Foreign Application Priority Data

Apr. 17, 2013   (KR) .................. 10-2013-0042469

(51) Int. Cl.
| | | |
|---|---|---|
| F01P 11/16 | (2006.01) | |
| F01P 3/12 | (2006.01) | |
| F01P 7/16 | (2006.01) | |

(52) U.S. Cl.
CPC . *F01P 7/16* (2013.01); *F01P 11/16* (2013.01); *F01P 2025/40* (2013.01); *Y02T 10/40* (2013.01)

(58) Field of Classification Search
CPC .................. F01P 7/00; F01P 5/14; F01P 7/16; F01P 3/12; F01P 11/16; G01N 25/72; G06G 7/70; G06F 15/00
USPC .................. 701/101; 123/41.01, 41.05, 41.15
See application file for complete search history.

(56) References Cited

U.S. PATENT DOCUMENTS

| | | | | |
|---|---|---|---|---|
| 6,321,695 | B1 * | 11/2001 | Yoo et al. .................... | 123/41.15 |
| 6,389,889 | B1 * | 5/2002 | Ford ........................... | 73/114.68 |
| 2004/0210361 | A1 * | 10/2004 | Na .................................. | 701/29 |
| 2008/0202452 | A1 * | 8/2008 | Wakahara et al. ......... | 123/41.15 |
| 2011/0054759 | A1 * | 3/2011 | Eser .............................. | 701/101 |
| 2012/0118248 | A1 * | 5/2012 | Mehring et al. ........... | 123/41.08 |
| 2013/0058373 | A1 * | 3/2013 | Sakurada ......................... | 374/4 |

FOREIGN PATENT DOCUMENTS

| | | |
|---|---|---|
| JP | 2004-232519 A | 8/2004 |
| JP | 2005-299633 A | 10/2005 |
| JP | 2012-193746 A | 10/2012 |
| KR | 10-2005-0098682 A | 10/2005 |
| KR | 10-2011-0044567 | 4/2011 |
| KR | 10-2011-0044567 A | 4/2011 |

* cited by examiner

*Primary Examiner* — Calvin Cheung
*Assistant Examiner* — Martin Weeks
(74) *Attorney, Agent, or Firm* — Mintz Levin Cohn Ferris Glovsky and Popeo, P.C.; Peter F. Corless

(57) ABSTRACT

A system and method for diagnosing failure of a thermostat that includes a controller configured to measure a coolant temperature and a coolant model temperature and determine a temperature of engine oil, when the coolant temperature is greater than a first reference temperature and the coolant model temperature is equal to or less than a second reference temperature. In addition, the controller is configured to determine an open status or a close status of the thermostat and diagnoses whether there is a failure in the open status of the thermostat, using the temperature of the engine oil as an independent variable.

20 Claims, 3 Drawing Sheets

SYSTEM AND METHOD FOR DIAGNOSING FAILURE OF THERMOSTAT

CROSS-REFERENCE TO RELATED APPLICATION

This application claims under 35 U.S.C. §119(a) the benefit of Korean Patent Application No. 10-2013-0042469 filed on Apr. 17, 2013, the entire contents of which are incorporated herein by reference.

BACKGROUND (a) Technical Field

The present invention relates to a system and method for diagnosing failure of a thermostat, and more particularly, to a system and method for diagnosing failure of a thermostat which senses failure of a thermostat opening function due to an increase in temperature of a coolant by the influence of an exhaust gas recirculation (EGR) cooler before an engine warms up.

(b) Background Art

Thermostats are devices disposed between a water pump and a radiator in a vehicle and maintain a constant engine temperature by opening or closing a valve based on the temperature of a coolant. The thermostats circulate a coolant to radiators by contracting and closing a valve when the coolant temperature decreases to a predetermined threshold and by thermally expanding and opening the valve when the coolant increases in temperature, using a material such as wax or pellet which contracts and expands with a change in temperature.

However, when the thermostats are open (hereafter, referred to as an 'open status') and fixed, a coolant keeps flowing to the radiator, and particularly, at the early stage of cold start, and the timing of an engine warm-up delays and combustion stability and catalyst activation deteriorate. As a measure against this problem, failure in the open status of the thermostats needs to be diagnosed.

FIG. 1 is an exemplary view schematically showing the flow of a coolant in a structure equipped with an EGR system. Referring to FIG. 1, with an EGR system applied, when temperature of a coolant rapidly increases due to the influence of a coolant that exchanged heat via an EGR cooler 2, a thermostat 3 opens and cools an engine 1 before the engine is warmed up, thereby delaying the timing of the engine warm-up.

However, even though the thermostat 3 opens early before the engine 1 warms up, the existing systems for diagnosing failure may not recognize the problem, but may recognize it as a normal open status of the thermostat. In addition, even in this type of system, it may be difficult to accurately diagnose the problem of opening of a thermostat before an engine warms up due to the influence of an EGR cooler.

The description provided above as a related art of the present invention is just for helping understanding the background of the present invention and should not be construed as being included in the related art known by those skilled in the art.

SUMMARY

The present invention provides a system and method for diagnosing failure of a thermostat which senses failure of a thermostat opening state due to an increase in temperature of a coolant by the influence of an EGR cooler before an engine warms up.

In particular, a method for diagnosing failure of a thermostat includes: a measuring step that measures coolant temperature and coolant model temperature; a first oil determining step that determines the temperature of engine oil, when the coolant temperature is greater than a first reference temperature and the coolant model temperature is a second reference temperature or less; and a first diagnosing step that determines an open status or a close status of a thermostat and diagnoses whether there is failure in the open status of the thermostat, using the temperature of the engine oil as an independent variable.

The measuring step may include a first failure step that determines that the thermostat is in the open status and the coolant temperature sensor broke down, when the coolant temperature is the first reference temperature or less and the coolant model temperature is greater than the second reference temperature. In addition, the first oil determining step may include a normal step that determines that the thermostat is in the close status and the close status of the thermostat is a normal operation status (e.g., a failure has not been detected), when the temperature of the engine oil is a third reference temperature or greater.

The first oil determining step may include: a first fuel determining step that determines the temperature of fuel, when the temperature of the engine oil is less than the third reference temperature; and a second failure step that determines that the thermostat is in the open status and the open status of the thermostat is an abnormal operation status (e.g., a failure is detected), when the temperature of the fuel is less than a fourth reference temperature.

The first fuel determining step may include: a second oil determining step that determines the temperature of the engine oil with a cooling fan operated, when the temperature of the fuel is equal to or greater than the fourth reference temperature; and a second diagnosing step that determines the open status or the close status of the thermostat, using the temperature of the engine oil as an independent variable.

The second oil determining step may include a normal step that determines that the thermostat is in the close status and the close status of the thermostat is a normal operation status, when the temperature of the engine oil is equal to or greater than a third reference temperature. Furthermore, the second oil determining step may include: a second fuel determining step that determines the temperature of fuel, when the temperature of the engine oil is less than the third reference temperature; and a second failure step that determines that the thermostat is in the open status and the open status of the thermostat is an abnormal operation status, when the temperature of the fuel is less than a fourth reference temperature.

Furthermore, the second oil determining step may include a normal step that determines that the thermostat is in the close status and the close status of the thermostat is a normal operation status, when the number of times that the fuel temperature is equal to or greater than the fourth reference temperature is a reference number of times or more.

The method may further include a condition determining step that determines whether it is a cold start condition, when an engine is started.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
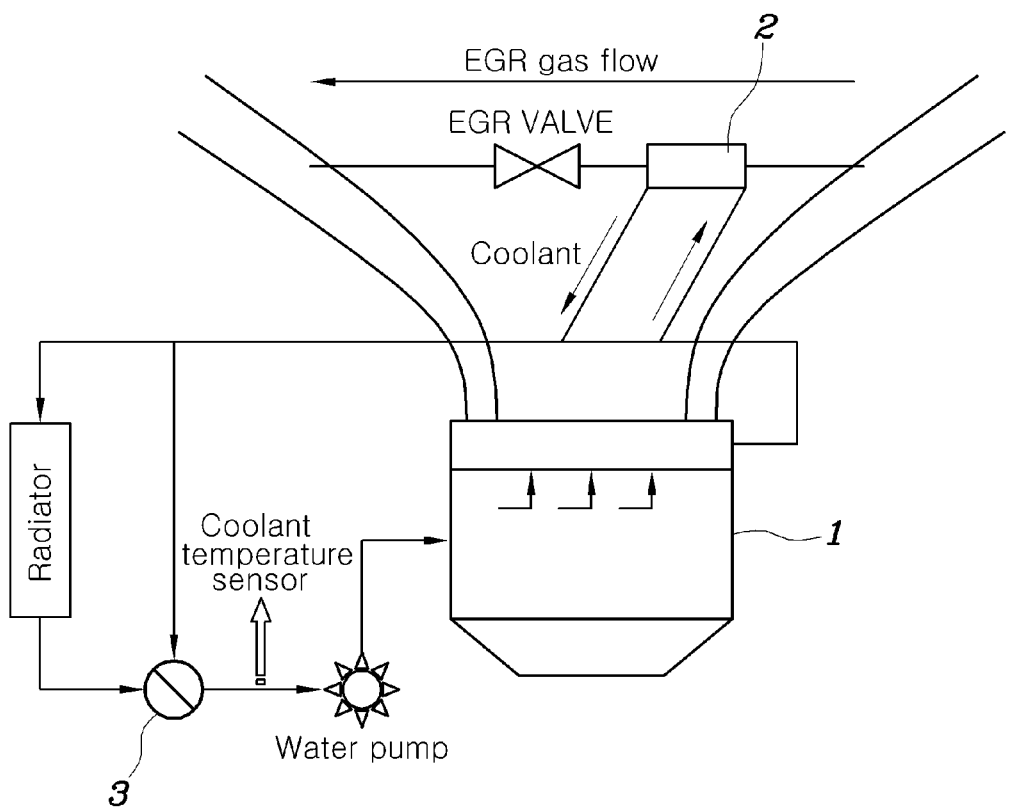
FIG. 1 is an exemplary view illustrating the flow of a coolant when an EGR system according to the related art is applied.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present invention are described hereafter in detail with reference to the accompanying drawings.

Figure 2:
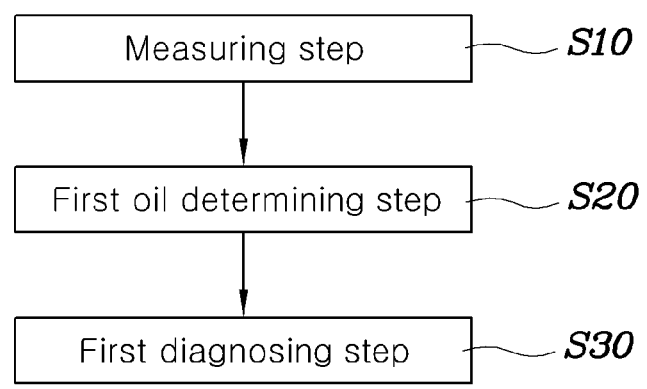
FIG. 2 is an exemplary diagram sequentially showing a method for diagnosing failure of a thermostat according to an exemplary embodiment of the present invention.
Figure 3:
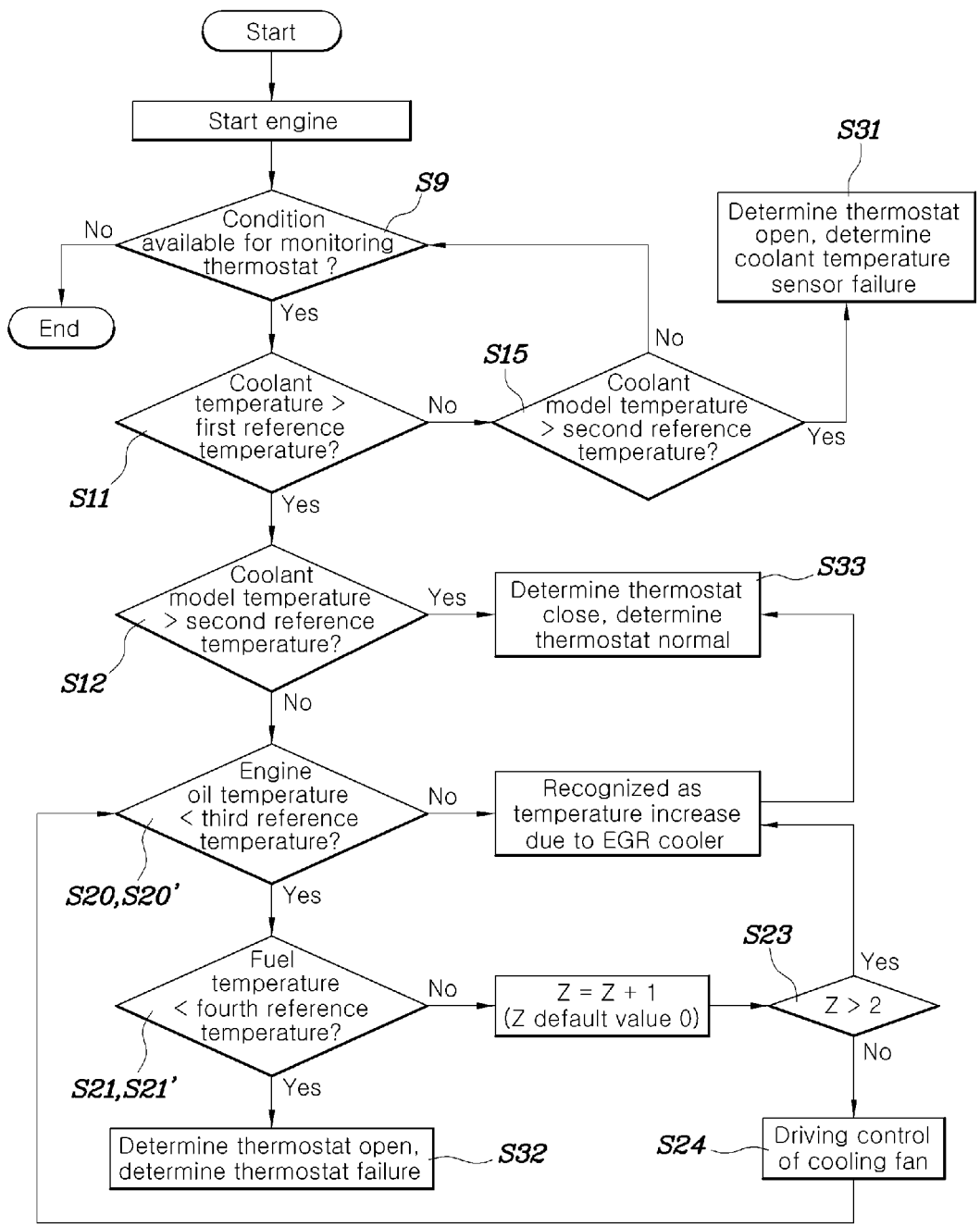
FIG. 3 is an exemplary diagram illustrating the diagnosis flow of the method for diagnosing failure of a thermostat according to an exemplary embodiment of the present invention.

FIG. 2 is an exemplary diagram sequentially showing a method for diagnosing failure of a thermostat according to an exemplary embodiment of the present invention and FIG. 3 is an exemplary diagram illustrating the diagnosis flow of the method for diagnosing failure of a thermostat according to an exemplary embodiment of the present invention.

A method for diagnosing failure of a thermostat according to an exemplary embodiment of the present invention may include a measuring step S10, a first oil determining step S20, and a first diagnosing step S30.

Referring to FIG. 2, in the control flow of the method for diagnosing failure of a thermostat according to an exemplary embodiment of the present invention, the method may include: the measuring step S10 that measures, by a controller, coolant temperature and coolant model temperature; the first oil determining step S20 that determines, by the controller, the temperature of engine oil, when the coolant temperature is greater than a first reference temperature and the coolant model temperature is equal to or less than a second reference temperature; and the first diagnosing step S30 that determines, by the controller, an open status or a close status of a thermostat and diagnoses whether there is failure in the open status of the thermostat, using the temperature of the engine oil as an independent variable.

The coolant temperature may be measured by a coolant temperature sensor. The first reference temperature that is compared with the coolant temperature may be used to diagnose the open status of a thermostat and as a calibration value variable for the types of engine, for example about 85° C. In other words, when the temperature of the coolant is greater than the first reference temperature of about 85° C., the open status of the thermostat may be diagnosed.

The coolant model temperature may be a value obtained by modeling the coolant temperature to coincide with engine conditions using an engine bench test. The modeling value may be obtained by repeating tests and may be a calibration value variable for the types of engine. The second reference temperature that is compared with the coolant model temperature may be a reference temperature for determining warm-up of an engine, for example about 72° C.

In other words, when the coolant temperature is greater than the first reference temperature and the coolant model temperature is equal to or less than the second reference temperature, the temperature of engine oil may be determined under the assumption that the increase of the coolant temperature is an abnormal warm-up of the engine, due to the influence of the EGR cooler. Further, using the temperature of the engine oil as an independent variable, whether there is failure in the open status of the thermostat may be determined, when the thermostat is in the open status.

The open status of the thermostat means a status in which the coolant is cooled through the radiator and the close status of the thermostat means a status in which the coolant is not cooled because the coolant did not pass through the radiator.

FIG. 3 is an exemplary diagram illustrating the diagnosis flow of the method for diagnosing failure of a thermostat according to an exemplary embodiment of the present invention.

Referring to FIG. 3, the measuring step S10 may include a first failure step S31 that determines, by the controller, that the thermostat is in the open status and the coolant temperature sensor may have failed, when the coolant temperature is equal to or less than the first reference temperature and the coolant model temperature is greater than the second reference temperature. In other words, when the coolant temperature is measured as the first reference temperature or less, even though the coolant model temperature is greater than the second reference temperature for warm-up of the engine, the temperature sensor that senses the temperature of the coolant may be determined to have failed.

Further, the first oil determining step S20 may include a normal step S33 that determines, by the controller, that the thermostat is in the close status and the close status of the thermostat is a normal operation status, when the temperature of the engine oil is equal to or greater than a third reference temperature. The third reference temperature may be set to the lowest temperature that the temperature of the engine oil may reach, when the temperature of the coolant reaches the first reference temperature using an engine bench test, for example about 20° C.

The third reference temperature, a value variable for the engine displacement using tests for features, may be obtained by modeling (e.g., temperature estimated or set in advance using a bench test). The temperature of the engine oil may be measured by receiving a sensor value in an engine equipped with an oil level sensor and an oil temperature sensor. In other words, when the temperature of the engine oil is equal to or greater than the third reference temperature, it may be determined that the temperature of the coolant was increased due to the influence of the EGR cooler and the thermostat may be determined to be in the close status.

In particular, the first oil determining step S20 may include: a first fuel determining step S21 that determines, by the controller, the temperature of fuel, when the temperature of the engine oil is less than the third reference temperature; and a second failure step S32 that determines, by the controller, that the thermostat is in the open status and the open status of the thermostat is an abnormal operation status, when the temperature of the fuel is less than a fourth reference temperature. In other words, the fourth reference temperature, which may be set using that fuel temperature reaches a reference temperature with the engine warmed up, may be a value variable using an engine bench test. For example, it may be set to about 40° C.

That is, when the temperature of the engine oil is equal to or less than the third reference temperature and the temperature of the fuel is equal to or less than the fourth temperature, it may be determined that the thermostat has opened and that the engine is not warmed up by the open status of the thermostat and only the coolant temperature is increased by the influence of the EGR cooler.

The first fuel determining step S21 may include: a second oil determining step S20' that determines, by the controller, the temperature of the engine oil while a cooling fan is operated, when the temperature of the fuel is equal to or greater than the fourth reference temperature; and a second diagnosing step that determines, by the controller, the open status or the close status of the thermostat, using the temperature of the engine oil as an independent variable. In other words, the open status or the close status of the thermostat may be diagnosed, by finding the cooling effect of the coolant by operating the cooling fan. The cooling fan may be operated at a highest level (e.g., maximum output), which may increase the accuracy in determining whether the coolant is cooled.

Further, the second oil determining step S20' may include a normal step S33 that determines, by the controller, that the thermostat is in the close status and the close status of the thermostat is a normal operation status, when the temperature of the engine oil is equal to or greater than a third reference temperature.

Further, the second oil determining step S20' may include: a second fuel determining step S21' that determines, by the controller, the temperature of fuel, when the temperature of the engine oil is less than the third reference temperature; and a second failure step S32 that determines, by the controller, that the thermostat is in the open status and the open status of the thermostat is an abnormal operation status, when the temperature of the fuel is less than a fourth reference temperature.

In particular, when the cooling fan operates with the thermostat open, the engine oil may decrease in temperature while the coolant is cooled. In other words, when the temperature of the engine oil is less than the third reference temperature, the temperature of the fuel may be determined, and when the temperature of the fuel is less than the fourth reference temperature, the thermostat may be diagnosed as being in the open status. The thermostat may be opened by the increase of only the coolant temperature due to the influence of the EGR cooler before the engine warmed up, in which the open status of the thermostat may be diagnosed as a failure status.

In contrast, when the cooling fan operates with the thermostat closed, the engine oil may increase in temperature while the coolant is not cooled. In other words, when the temperature of the engine oil is equal to or greater than the third reference temperature, the thermostat may be determined to be in the close status and the close status of the thermostat may be diagnosed as a normal status.

Further, the second oil determining step S20' may include a normal step S33 that determines, by the controller, that the thermostat is in the close status and the close status of the thermostat is a normal operation status, when the number of times Z when the temperature of the fuel is measured to be equal to or greater than the fourth reference temperature is a reference number of times or more. In other words, when the temperature of the fuel is measured to be equal to or greater than the fourth reference temperature, the temperature of the engine oil may be compared with the third reference temperature by operating the cooling fan, and when the number of times Z when the temperature of the fuel is measured to be equal to or greater than the fourth reference temperature is greater than a reference number of times, the thermostat may be determined to be in the close status and the close status of the thermostat may be diagnosed as a normal status.

The flow of the method for diagnosing failure of a thermostat according to an exemplary embodiment of the present invention is described hereafter.

Referring to FIG. 2, first, when an engine is started, whether the current engine condition is a condition available for monitoring a failure diagnosis of a thermostat may be determined (S9).

The condition available for monitoring is when the coolant temperature ranges from about −6 to 55° C. when the engine is started, and when the RPM of the engine is about 4800 RPM or less and the intake temperature is about −6° C. or more. In other words, the condition available for monitoring for a failure diagnosis of the thermostat may be a cold start condition of the engine. In this configuration, the engine may be equipped with an EGR system to allow the coolant to flow through the EGR cooler.

Next, the coolant temperature may be compared with the first reference temperature (S11). When the coolant temperature is greater than the first reference temperature, as the result of the comparison, the coolant model temperature may be compared with the second reference temperature (S12). When the coolant model temperature is equal to or less than the second reference temperature, as the result of the comparison, the temperature of the engine oil may be compared with the third reference temperature (S20).

When the temperature of the engine oil is equal to or less than the third reference temperature, as the result of the comparison, the temperature of the fuel may be compared with the fourth reference temperature (S21). When the temperature of the fuel is equal to or less than the fourth reference temperature, as the result of the comparison, the thermostat may be determined to be in the open status and the open status of the thermostat may be diagnosed as a failure status (S32).

In other words, when the temperature of the coolant is measured to be substantially high and the coolant modeling temperature is measured to be substantially low, the temperature of the engine oil and the fuel may be measured. When the measured temperature of the engine oil and the fuel is equal to or less than a reference temperature, it may be determined that the thermostat has opened and is in connection with cooling of the engine oil and the fuel and a failure diagnosis detecting that the engine is not warmed up by the open status of the thermostat and only the coolant temperature increases due to the influence of the EGR cooler may be performed.

When the coolant temperature is equal to or less than the first reference temperature in S11, the coolant model temperature may be compared with the second reference temperature (S15). When the coolant model temperature is greater than the second reference temperature, as the result of the comparison, it may be determined that the engine normally warms up and the thermostat is in the open status, but it may be determined that the coolant temperature sensor has failed (S31). When the coolant model temperature is equal to or less than the second reference temperature in S15, the process may continue to the condition determining step of S9 and it may be determined again whether it is a condition available for monitoring of a thermostat.

When the coolant model temperature is greater than the second reference temperature in S12, the coolant temperature and the coolant model temperature may be greater than the reference temperatures, and thus the thermostat may be determined to be in the close status, a normal status (S33).

When the temperature of the engine oil is equal to or greater than the third reference temperature in S20, it may be determined that the increase in temperature is the increase in temperature due to the EGR cooler and the thermostat may be determined to be in the close status (S33).

When the temperature of the fuel is equal to or greater than the fourth reference temperature, the cooling fan may be operated (S24) and the temperature of the engine oil may be compared with the third reference temperature (S20'). In other words, whether the coolant is cooled may be determined based on a change in temperature of the engine oil due to the operation of the cooling fan and from which whether the thermostat is open or closed may be determined.

Furthermore, whether the number of times Z when the fuel temperature is measured to be equal to or greater than the fourth reference temperature by operating the cooling fan is greater than a reference number of times may be determined (S23), and then when it is greater than the reference number of times, it may be determined that the increase in temperature may be due to the EGR cooler. Further, the thermostat may be determined to be in the close status and the close status of the thermostat may be determined as a normal status (S33).

However, in operating the cooling fan, when the temperatures of the engine oil and the fuel are equal to or less than reference temperatures, respectively, (S20') (S21'), the thermostat may be diagnosed to be in the open status and a failure diagnosis that the engine does not warm up due to the open status of the thermostat and only the coolant temperature may be increased by the influence of the EGR cooler may be performed (S32).

According to the present invention, it may be possible to prevent incorrect sensing of a thermostat without requiring an additional temperature sensor, by diagnosing failure in which an engine does not warm up and only the coolant temperature is increased by the influence of an EGR cooler, when diagnosing opening of the thermostat.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A method for diagnosing failure of a thermostat, comprising:
    measuring, by a controller, a coolant temperature and a coolant model temperature;
    determining, by the controller, a temperature of engine oil, when the coolant temperature is greater than a first reference temperature and the coolant model temperature is equal to or less than a second reference temperature;
    determining, by the controller, an open status or a closed status of the thermostat; and
    determining whether there is failure in the open status of the thermostat, using the temperature of the engine oil as an independent variable.

2. The method of claim 1, further comprising:
    determining, by the controller, that the thermostat is in the open status and a coolant temperature sensor has failed, when the coolant temperature is equal to or less than the first reference temperature and the coolant model temperature is greater than the second reference temperature.

3. The method of claim 1, further comprising:
    determining, by the controller, that the thermostat is in the closed status and the closed status of the thermostat is a normal operation status, when the temperature of the engine oil is equal to or greater than a third reference temperature.

4. The method of claim 1, further comprising:
    determining, by the controller, a fuel temperature, when the temperature of the engine oil is less than the third reference temperature; and
    determining, by the controller, that the thermostat is in the open status and the open status of the thermostat is an abnormal operation status, when the temperature of the fuel is less than a fourth reference temperature.

5. The method of claim 4, further comprising:
    determining, by the controller, the temperature of the engine oil while a cooling fan is operated, when the temperature of the fuel is equal to or greater than the fourth reference temperature; and
    determining, by the controller, the open status or the closed status of the thermostat, using the temperature of the engine oil as an independent variable.

6. The method of claim 5, further comprising:
determining, by the controller, that the thermostat is in the closed status and the closed status of the thermostat is a normal operation status, when the temperature of the engine oil is equal to or greater than the third reference temperature.

7. The method of claim 5, further comprising:
determining, by the controller, the fuel temperature, when the temperature of the engine oil is less than the third reference temperature; and
determining, by the controller, that the thermostat is in the open status and the open status of the thermostat is an abnormal operation status, when the temperature of the fuel is less than a fourth reference temperature.

8. The method of claim 5, further comprising:
determining, by the controller, that the thermostat is in the closed status and the closed status of the thermostat is a normal operation status, when the number of times the temperature of the fuel is measured to be equal to or greater than the fourth reference temperature is equal to or greater than a reference number.

9. The method of claim 1, further comprising:
determining, by the controller, whether a cold start condition exists, when an engine is started.

10. A system for diagnosing failure of a thermostat, comprising:
a controller configured to:
measure a coolant temperature and a coolant model temperature;
determine a temperature of engine oil, when the coolant temperature is greater than a first reference temperature and the coolant model temperature is equal to or less than a second reference temperature;
determine an open status or a closed status of the thermostat; and
determine whether there is failure in the open status of the thermostat, using the temperature of the engine oil as an independent variable.

11. The system of claim 10, wherein the controller is further configured to:
determine that the thermostat is in the open status and a coolant temperature sensor has failed, when the coolant temperature is equal to or less than the first reference temperature and the coolant model temperature is greater than the second reference temperature.

12. The system of claim 10, wherein the controller is further configured to:
determine that the thermostat is in the closed status and the closed status of the thermostat is a normal operation status, when the temperature of the engine oil is equal to or greater than a third reference temperature.

13. The system of claim 10, wherein the controller is further configured to:
determine a fuel temperature, when the temperature of the engine oil is less than the third reference temperature; and
determine that the thermostat is in the open status and the open status of the thermostat is an abnormal operation status, when the temperature of the fuel is less than a fourth reference temperature.

14. The system of claim 13, wherein the controller is further configured to:
determine the temperature of the engine oil while a cooling fan is operated, when the temperature of the fuel is equal to or greater than the fourth reference temperature; and
determine the open status or the closed status of the thermostat, using the temperature of the engine oil as an independent variable.

15. The system of claim 14, wherein the controller is further configured to:
determine that the thermostat is in the closed status and the closed status of the thermostat is a normal operation status, when the temperature of the engine oil is equal to or greater than the third reference temperature.

16. The system of claim 14, wherein the controller is further configured to:
determine the fuel temperature, when the temperature of the engine oil is less than the third reference temperature; and
determine that the thermostat is in the open status and the open status of the thermostat is an abnormal operation status, when the temperature of the fuel is less than a fourth reference temperature.

17. A non-transitory computer readable medium containing program instructions executed by a controller, the computer readable medium comprising:
program instructions that measure a coolant temperature and a coolant model temperature;
program instructions that determine a temperature of engine oil, when the coolant temperature is greater than a first reference temperature and the coolant model temperature is equal to or less than a second reference temperature;
program instructions that determine an open status or a closed status of the thermostat; and
program instructions that determine whether there is failure in the open status of the thermostat, using the temperature of the engine oil as an independent variable.

18. The non-transitory computer readable medium of claim 17, further comprising:
program instructions that determine that the thermostat is in the open status and a coolant temperature sensor has failed, when the coolant temperature is equal to or less than the first reference temperature and the coolant model temperature is greater than the second reference temperature.

19. The non-transitory computer readable medium of claim 17, further comprising:
program instructions that determine that the thermostat is in the closed status and the closed status of the thermostat is a normal operation status, when the temperature of the engine oil is equal to or greater than a third reference temperature.

20. The non-transitory computer readable medium of claim 17, further comprising:
program instructions that determine a fuel temperature, when the temperature of the engine oil is less than the third reference temperature; and
program instructions that determine that the thermostat is in the open status and the open status of the thermostat is an abnormal operation status, when the temperature of the fuel is less than a fourth reference temperature.

* * * * *